(12) United States Patent
Kai (10) Patent No.: US 7,683,824 B2
(45) Date of Patent: Mar. 23, 2010

(54) RADAR APPARATUS

(75) Inventor: Koichi Kai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 208 days.

(21) Appl. No.: 11/898,849

(22) Filed: Sep. 17, 2007

(65) Prior Publication Data

US 2008/0258962 A1 Oct. 23, 2008

(30) Foreign Application Priority Data

Apr. 19, 2007 (JP) ............................. 2007-110265

(51) Int. Cl.
*G01S 13/58* (2006.01)
*G01S 13/34* (2006.01)
*G01S 13/42* (2006.01)

(52) U.S. Cl. .................. 342/114; 342/107; 342/115; 342/128; 342/133; 342/196

(58) Field of Classification Search ............ 342/70–72, 342/81, 83, 102, 104, 107–109, 113–115, 342/118, 127, 128, 145–147, 157, 158, 173–175, 342/192–196, 200
See application file for complete search history.

(56) References Cited

U.S. PATENT DOCUMENTS 6,903,678 B2 * 6/2005 Kumon et al. .................. 342/70

7,511,659 B2 * 3/2009 Wakayama et al. ......... 342/196
7,532,156 B2 * 5/2009 Honda ........................ 342/173

FOREIGN PATENT DOCUMENTS

| JP | 2000-284047 A | 10/2000 |
| JP | 3498624 B2 | 2/2004 |
| JP | 2006-003303 A | 1/2006 |
| JP | 3780904 B2 | 5/2006 |

OTHER PUBLICATIONS

Machine translation of JP 2000-28047.*
Japanese Office Action dated Nov. 18, 2008.

* cited by examiner

*Primary Examiner*—Thomas H Tarcza
*Assistant Examiner*—Cassi Galt
(74) *Attorney, Agent, or Firm*—Sughrue Mion, PLLC (57) ABSTRACT

A radar apparatus includes a sending unit for sending a transmission wave, a plurality of receiving parts for receiving a reflected wave from a reflecting object in a parallel manner, beat signal generation parts for acquiring beat signals at the receiving parts, respectively, from the transmission wave and the wave received at the receiving parts, a beat signal processing part for individually processing the beat signals of the receiving parts, a DBF processing part for DBF processing a beat signal processing result, and an object detection part for acquiring information on the reflecting object from frequency components of a DBF processing result or the beat signal processing result. Amounts of phase lag of the receiving parts are set to different values. The beat signal processing part includes a phase correction part that corrects the phase lag amounts corresponding to the individual receiving parts so as to make them equal to one another.

6 Claims, 9 Drawing Sheets

RADAR APPARATUS

BACKGROUND OF THE INVENTION

1. Field of the Invention

The present invention relates to a radar apparatus using an FMCW system, and more particularly, it relates to a technique for avoiding false detection of a reflecting object due to "false frequency components" in a beat signal processing part.

2. Description of the Related Art

In radar apparatuses using a conventional FMCW system, there has been known a technique that synthesizes an antenna beam by applying digital beam forming (hereinafter referred to as "DBF") processing to individual beat signals obtained from a plurality of receiving parts, and also there has been proposed an apparatus that does not perform IQ detection but Ich detection alone (see, for example, a first patent document: Japanese patent No. 3780904 (page 4)).

In the conventional apparatus described in the first patent document, only the absolute value of a frequency component can be obtained for one received wave, and the plus or minus of the sign thereof can not be identified, so in order to solve this, the polarity or sign of the beat frequency is determined or identified by the following comparison processing (A) or (B).

(A): A comparison is made between the signs of changes (derivative) of the phase of the beat frequency during the increase and decrease of the sending frequency.

(B): A comparison is made between the signs of the phase differences in the beat frequency between two element antennas during the increase and decrease of the sending frequency.

Thereafter, a correct object detection result is obtained by inverting the sign (plus and minus) of the beam direction in accordance with the above-mentioned comparison result.

In the conventional radar apparatus, it is necessary to identify the polarity or sign of the beat signal frequency in an accurate manner, and unless the sign of the beat frequency could not be identified correctly, there would be a problem of misidentifying the sign of the beam direction, too.

In addition, in case where there exist a plurality of received waves, a plurality of frequency components are generated in each beat signal during the increase and decrease of the sending frequency, but there has been a problem that the sign of each beat frequency is not able to be correctly identified unless the beat frequencies of the individual received waves are correctly combined.

SUMMARY OF THE INVENTION

Accordingly, the present invention is intended to solve the problems as referred to above, and has for its object to obtain a radar apparatus in which amounts of phase lag in individual receiving parts (hereinafter referred to as "receiving channels") are set to be unequal to one another (i.e., mutually different from one another), and received positive and negative frequency components are corrected in their phases and subjected to DBF processing thereby to make larger the reception level of the frequency of a correct one of positive and negative beat frequencies, so that only true frequency components can be summed but false frequency components can not be summed, whereby the polarity or sign of the frequency can be identified by comparison of the magnitude of the reception level thereof, thus making it unnecessary to perform beat frequency combination processing during the increase or decrease of the sending frequency.

Bearing the above object in mind, a radar control apparatus according to the present invention includes: a sending unit that sends a transmission wave of a fixed frequency or variable frequency; a plurality of receiving parts that receive a reflected wave of the sending wave from a reflecting object in a parallel manner; beat signal generation parts that acquire beat signals for the plurality of individual receiving parts, respectively, from the transmission wave generated by the sending unit and the reflected or reception wave received by the individual receiving parts; a beat signal processing part that individually processes the beat signals of the plurality of individual receiving parts thereby to acquire a beat signal processing result; a DBF processing part that DBF processes the beat signal processing result thereby to acquire a DBF processing result; and an object detection part that acquires information on at least one of a distance, a speed and an angle of the reflecting object from frequency components of the DBF processing result or the beat signal processing result. Amounts of phase lag of the plurality of receiving parts are set to values mutually different from one another. The beat signal processing part includes a phase correction processing part. The phase correction processing part corrects the amounts of phase lag corresponding to the plurality of individual receiving parts in the beat signal processing part so as to make them equal to one another.

According to the present invention, by making it possible for only true frequency components to be summed and for false frequency components not to be summed, the plus or minus sign of the frequencies can be identified by comparison of the magnitudes of the reception levels thereof, thereby making it unnecessary to provide beat frequency combination processing during the increase or decrease of the sending frequency.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENTS

Hereinafter, a preferred embodiment of the present invention will be described while referring to the accompanying drawings.

Embodiment 1

Figure 1:
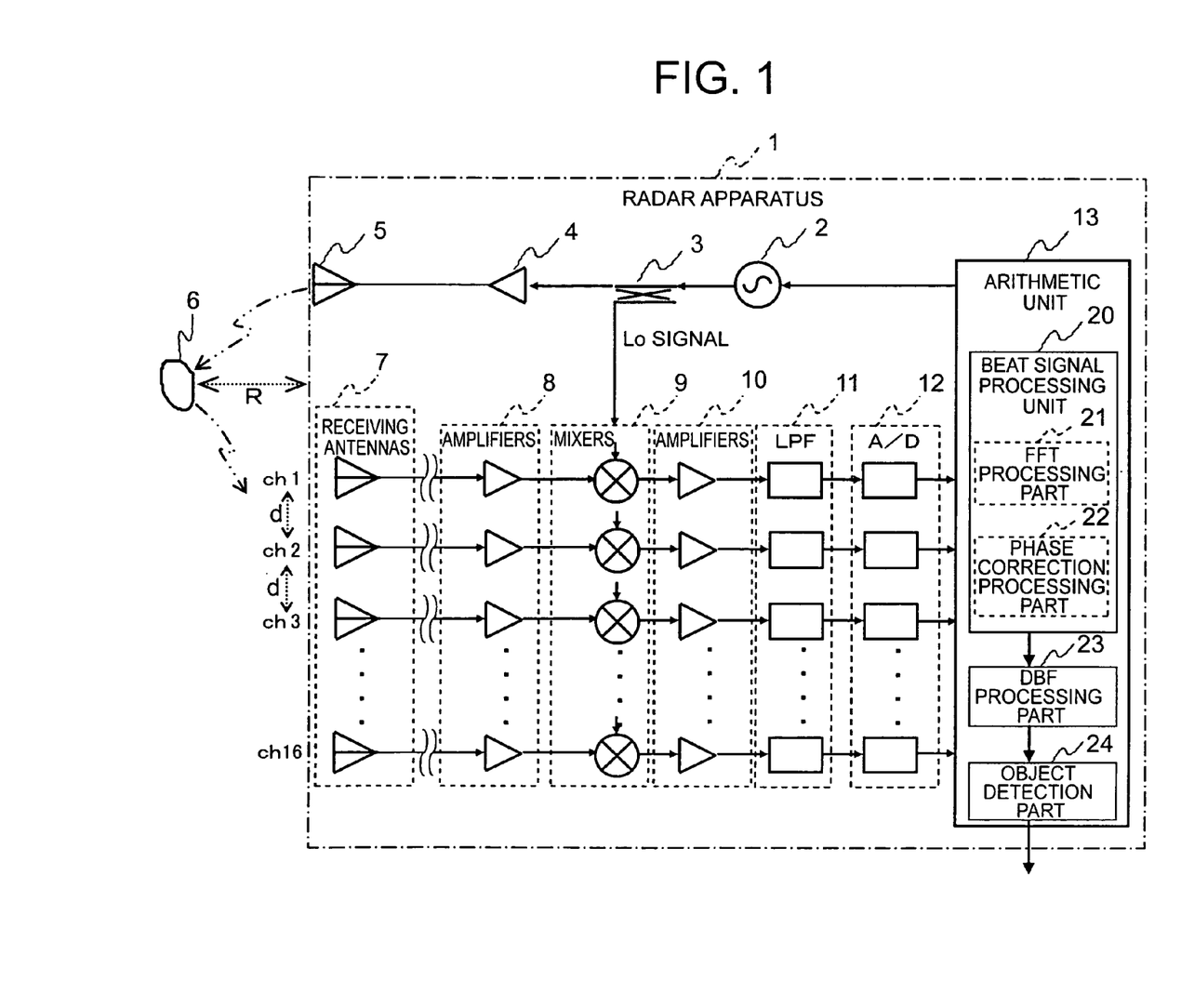
FIG. 1 is a block diagram showing a radar apparatus according to a first embodiment of the present invention.

Referring to the drawings and first to FIG. 1, there is shown a block diagram of a radar apparatus according to a first embodiment of the present invention.

In FIG. 1, in order to detect a reflecting object 6, the radar apparatus, generally designated by reference numeral 1, includes, a voltage controlled oscillator 2, a distributor 3, a sending amplifier 4, a sending antenna 5, a plurality of receiving antennas 7, a plurality of receiving amplifiers 8, a plurality of mixers 9, a plurality of beat signal amplifiers 10, a plurality of low-pass filters 11, a plurality of A/D converters 12, and an arithmetic unit 13.

The voltage controlled oscillator 2 generates an electromagnetic wave of a specific sending frequency ftx (e.g., ftx=76–77 [GHz]), and the distributor 3 distributes electric power of an electromagnetic wave from the voltage controlled oscillator 2 to the sending amplifier 4 and the receiving-side mixers 9.

The sending amplifier 4 amplifies the electric power of the electromagnetic wave supplied from the distributor 3, and the sending antenna 5 sends the transmission electromagnetic wave (hereinafter referred to as a "transmission wave") amplified by the amplifier 4 to space.

The voltage controlled oscillator 2, the distributor 3, the amplifier 4, and the sending antenna 5 together constitute a sending unit that sends a transmission wave of a fixed frequency or a variable frequency.

The plurality of receiving antennas 7 receive a reflection electromagnetic wave (hereinafter referred to as a "reflection wave") that is the transmission wave reflected and returned by the reflecting object 6 in a parallel manner. Although in FIG. 1, there is shown the case where the receiving antennas 7 are comprised of 16 antennas ch1 through ch16, the number of the antennas may be arbitrarily set. In addition, although the plurality of receiving antennas 7 are expediently disposed on a straight line at equal intervals of a distance d, they neither need necessarily be disposed at equal intervals, nor on a straight line.

The receiving amplifiers 8, the mixers 9, the beat signal amplifiers 10, the low-pass filters 11, and the A/D converters 12 are each composed of the same number of channels as that of the receiving antennas 7, and arranged in parallel with respect to one another.

The A/D converters 12 function as an AND input processing part of the arithmetic unit 13, and are included in the function of the beat signal processing part 20 (to be described later) in the arithmetic unit 13.

The receiving amplifiers 8 serve to amplify the reflected wave received from the individual receiving antennas 7 and input it to the mixers 9.

The receiving antennas 7 and the amplifiers 8 together constitute a plurality of receiving parts that receive the reflection wave of the transmission wave reflected from the reflecting object 6.

Transmission delay amounts (amounts of phase lag) of a signal in the receiving parts (from the receiving antennas 7 to the mixers 9) are set to predetermined values different from one another for individual channels, respectively. For example, as a method of setting the transmission delay amounts (the amounts of phase lag) to unequal values, respectively, there can be considered a method of changing line lengths from the individual receiving antennas 7 to the mixer 9 for the individual channels, respectively. In this case, the amounts of the phase lag are set with random numbers (random values) within a range of $\pm\pi/2$ [rad], as will be described later.

The mixers 9, the beat signal amplifiers 10, and the low-pass filters 11 together constitute beat signal generation parts for acquiring beat signals for individual receiving parts, respectively.

The mixers 9 each mix an Lo signal (local oscillation signal generated by the sending unit) from the distributor 3 and the reflected wave (the reception wave received by the plurality of individual receiving parts) from the reflecting object 6, and output a beat signal corresponding to a distance R, a relative speed and an angle of the reflecting object 6.

The beat signals from the mixers 9 are input through the amplifiers 10 and the low-pass filters 11 to the A/D converters 12, respectively, where they are converted into digital signals which are then input to the arithmetic unit 13. At this time, the beat signals output from the mixers 9 through the amplifiers 10 include unnecessary signal components other than the beat signal components, but only the beat signal components can be taken out by being passed through the low-pass filters 11.

The arithmetic unit 13 is provided with the beat signal processing part 20, a DBF processing part 23, and an object detection part 24, and serves to control the voltage controlled oscillator 2, and calculate object information of at least one of the distance R, the relative speed and the angle of the reflecting object 6 based on the A/D converted values of the beat signals.

The beat signal processing part 20 has the A/D converter 12 (the A/D input processing part), a window function processing part (not shown), an FFT (fast Fourier transform) processing part 21, and a phase correction processing part 22. The beat signal processing part 20 acquires a beat signal processing result by individually processing the beat signals of the plurality of individual receiving parts obtained by the beat signal generation parts by using the FFT processing part 21, and outputs the beat signal processing result thus obtained after performing phase correction thereof (to be described later) by using the phase correction processing part 22.

The phase correction processing part 22 corrects the amounts of phase lag corresponding to the plurality of individual receiving parts in the beat signal processing part 20 so as to make them equal to one another, and outputs a beat signal processing result thus obtained.

The DBF processing part 23 acquires a DBF processing result by processing the beat signal processing result from the beat signal processing part 20 according to DBF processing.

The object detection part 24 acquires information of at least one of the distance R, the speed, and the angle of the reflecting object 6 from the frequency component of the DBF processing result by the DBF processing part 23 or of the beat signal processing result by the beat signal processing part 20, and outputs them to the outside.

Now, reference will be made to a signal processing operation according to the first embodiment of the present invention as illustrated in FIG. 1 while referring to a flow chart in FIG. 2.

Figure 2:
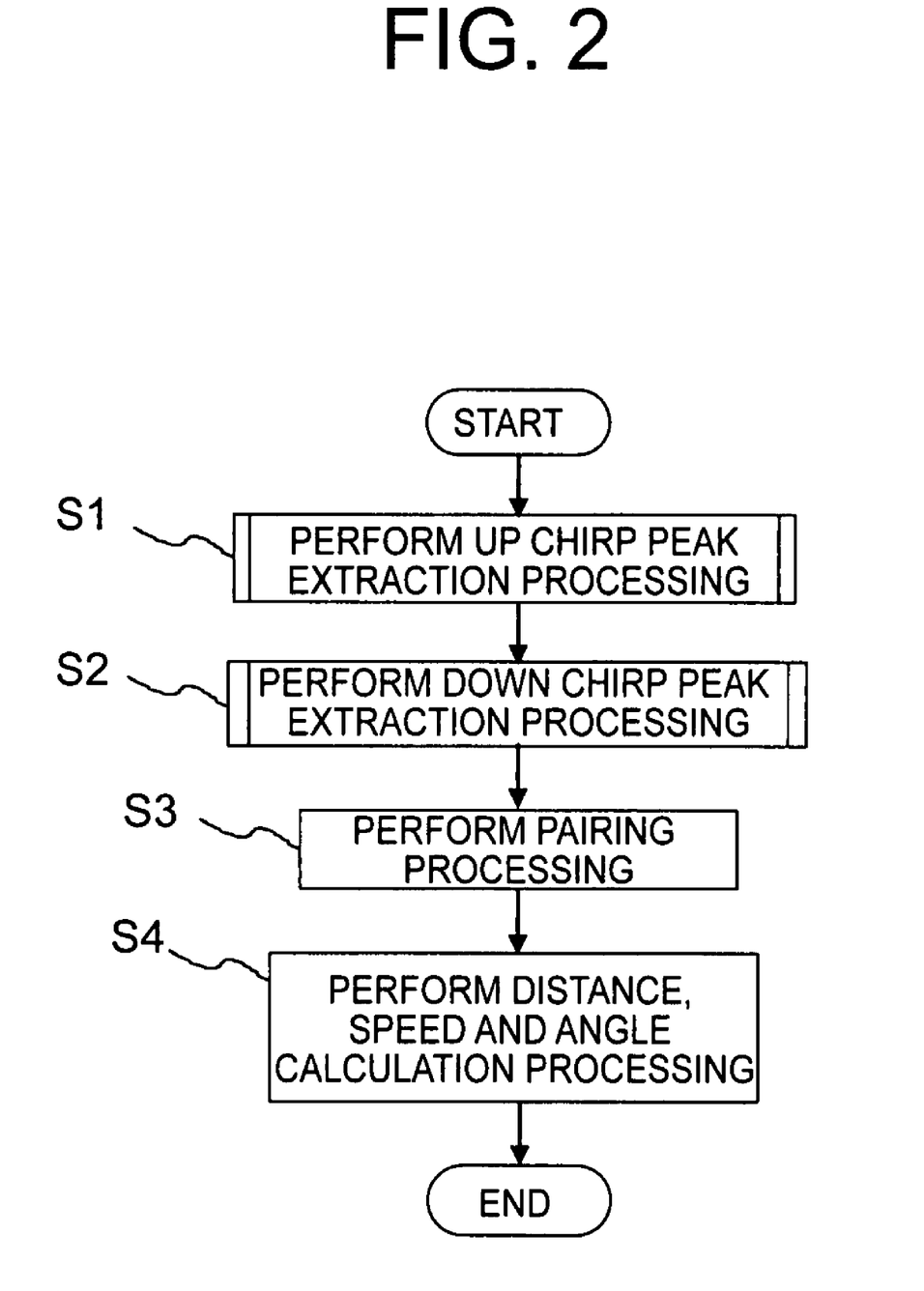
FIG. 2 is a flow chart illustrating a signal processing procedure according to the first embodiment of the present invention.

In FIG. 2, the arithmetic unit 13 first performs peak extraction processing during the time when the sending frequency is rising or increasing (hereinafter referred to as "UP chirp") (step S1), and then performs peak extraction processing during the time when the sending frequency is falling or decreasing (hereinafter referred to as "DOWN chirp") (step S2).

Subsequently, pairing processing is performed based on the peak extraction processing result of the UP chirp and the DOWN in steps S1 and S2, respectively, (step S3).

Finally, the distance R, the speed and the angle of the reflecting object 6 are calculated from the sum and difference between the frequencies of each pair in the pairing processing result in step S3 (step S4), and the processing of FIG. 2 is terminated. Here, note that a detailed method for calculating the distance R and the speed in step S4 is omitted since it is well-known from the above-mentioned first patent document, etc.

As for the angle of the reflecting object 6, it is possible to calculate, as the angle of the reflecting object 6, the angle selected in the peak extraction processing (steps S1, S2), i.e., the direction of a beam in which the reception level thereof is the largest among all the beams. Alternatively, it is also possible to calculate the angle of the reflecting object 6 according to super-resolution processing such as a MUSIC method, etc., by using the frequency components of individual receiving channels at peaks. Thus, any of the calculation methods can be adopted.

Next, detailed reference will be made to the peak extraction processing (steps S1, S2) by the beat signal processing part 20 in detail while referring to a flow chart in FIG. 3.

Figure 3:
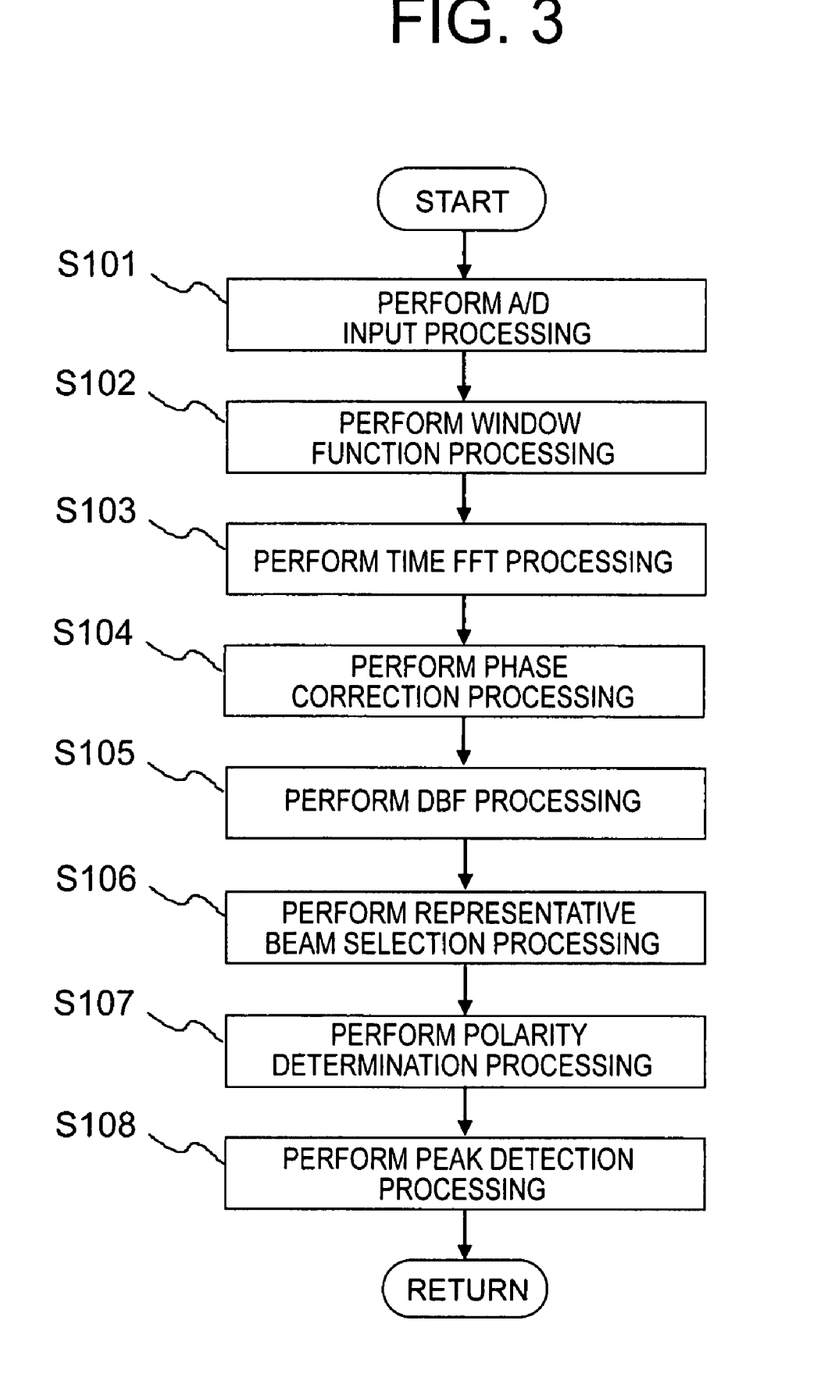
FIG. 3 is a flow chart illustrating peak extraction processing of a beat signal processing part according to the first embodiment of the present invention.

In FIG. 3, first of all, the A/D converter 12 (A/D input processing part) converts the beat signals of individual receiving channels from analog into digital form at regular intervals, and performs A/D input processing (step S101). Specifically, A/D converted values at 256 times multiplied by 16 (the number of all the receiving channels) per processing period are acquired.

Subsequently, the window function processing part in the beat signal processing part 20 performs window function processing of multiplying the individual A/D input processing results of the individual receiving channels by a window function (here, a Hanning window is adopted), respectively (step S102).

In addition, the FFT processing part 21 performs time FFT processing by applying fast Fourier transform to the individual window function processing results of the individual receiving channels, respectively (step S103). Here, not IQ detection but Ich detection alone is carried out. In addition, the window function processing results at 256 points are input to the FFT processing part 21 as real parts of FFT input data at 256 points, and the imaginary parts thereof are filled with "0".

Thereafter, the phase correction processing part 22 performs phase correction processing by rotating the phases of all the positive and negative frequency components of the time FFT processing results of the individual receiving channels other than channel ch1 by phase lag amounts of the individual receiving channels (step S104). Here, note that both of positive and negative frequencies are used, but only positive frequencies may be stored for the purpose of saving storage areas, and only two kinds of positive and negative correction processing may be carried out in each frequency component.

Then, the DBF processing part 23 performs the DBF processing for each same frequency component on the time FFT results after the phase correction of the individual receiving channels (step S105). Although DBF processing is executed here on the basis of FFT having the values of the individual channels as input information for the sake of simplification of explanation, summation may be carried out after executing the phase shift processing for each arbitrary direction. Hereinafter, the individual frequency components of the FFT results are referred to as "beams", respectively. At this time, a beam corresponding to a frequency of 0 becomes a beam in a front direction.

Then, the object detection part 24 selects a beam having the largest reception level among all the beams in each FFT result, i.e., each of the frequency components of the time FFT results, and performs representative beam selection processing as a representative beam for each of the frequency components of the time FFT results (step S106).

In addition, the object detection part 24 compares the reception levels of the representative beams selected by the representative beam selection processing (step S106) for a pair of two positive and negative frequency components of which the absolute values are equal to each other in the frequency components of the time direction FFT results, and selects only the larger frequency component thereby to perform the polarity or sign (plus or minus) determination processing (step S107).

Finally, the object detection part 24 performs peak detection processing for each beam (step S108), and the processing of FIG. 3 is terminated. Here, note that in step S108, frequency components not selected by the polarity determination processing (step S107) can not be detected as a peak and frequency components less than a predetermined threshold value can not be detected as a peak, either.

Here, reference will be made, by way of a concrete example of the first embodiment of the present invention, to a case where the reflecting object 6 exists at a predetermined distance R, a predetermined speed, and a predetermined angle with respect to the radar apparatus 1, while referring to explanatory views in FIG. 4 through FIG. 10.

Figure 4:
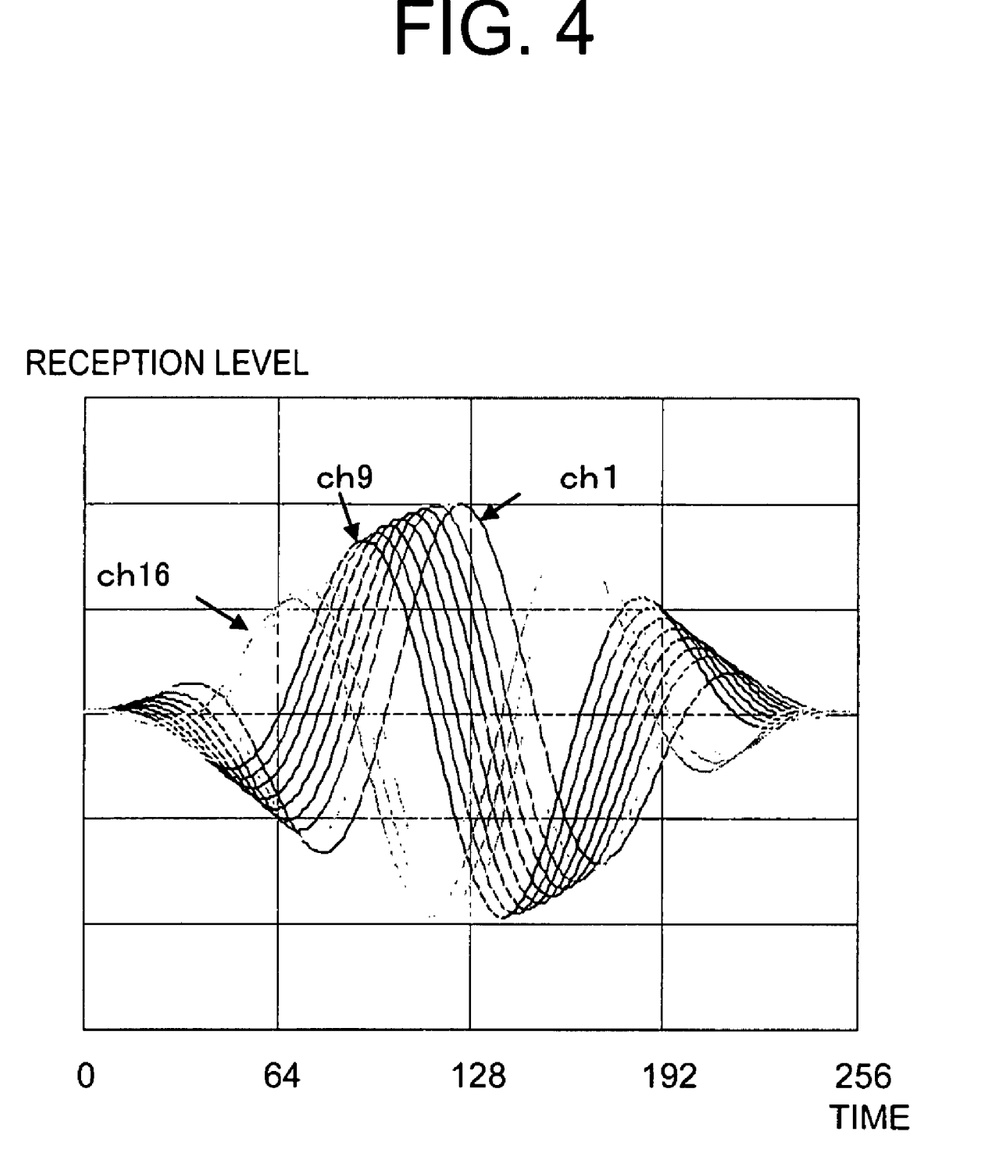
FIG. 4 is an explanatory view showing a general window function processing result in case where the amounts of phase change are not set (i.e., the phase lags of individual receiving channels are all equal).
Figure 5:
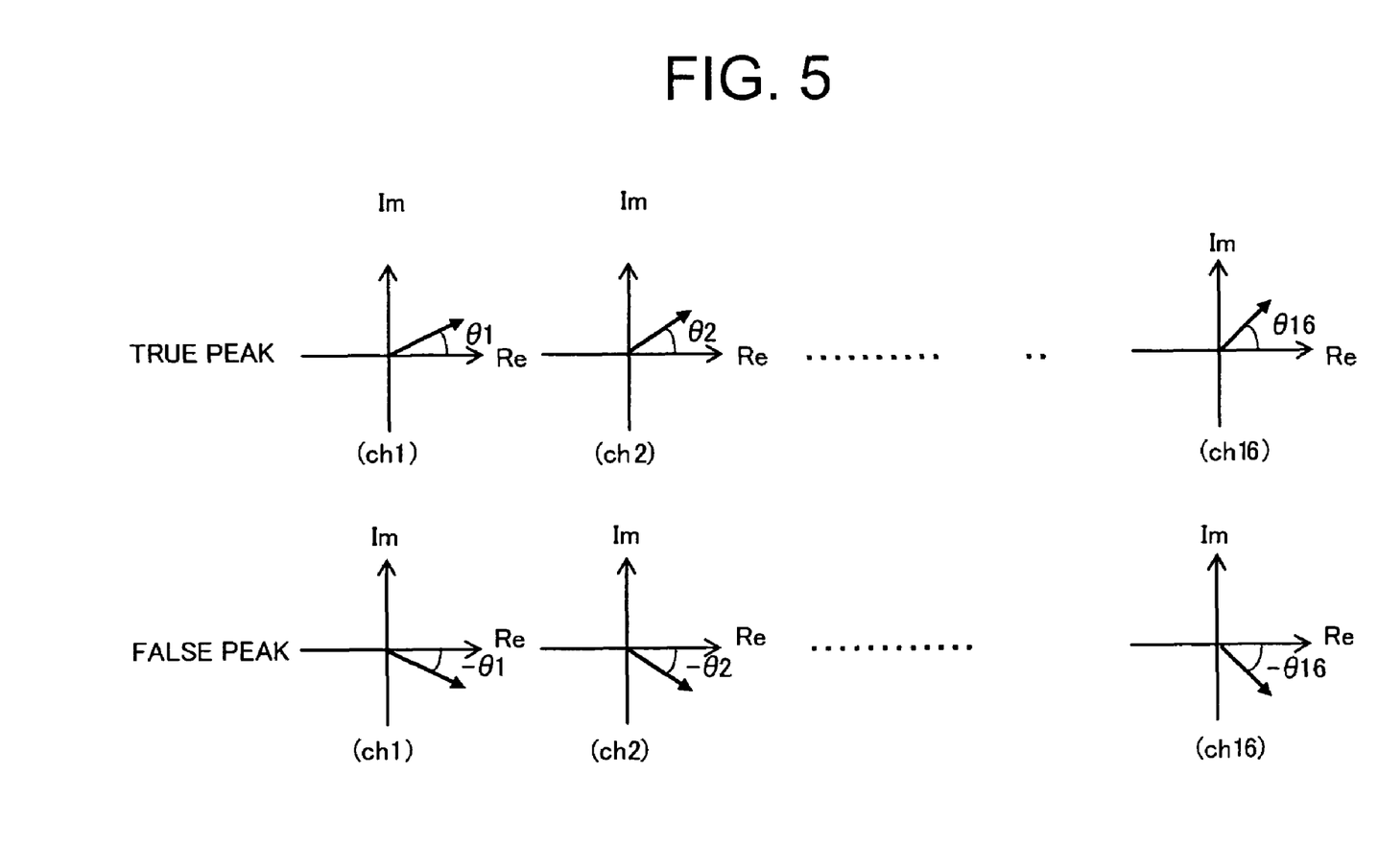
FIG. 5 is an explanatory view showing the relation between the phases of general peaks of individual channels in case where the amounts of phase change are not set (i.e., the phase lags of individual receiving channels are all equal).
Figure 6:
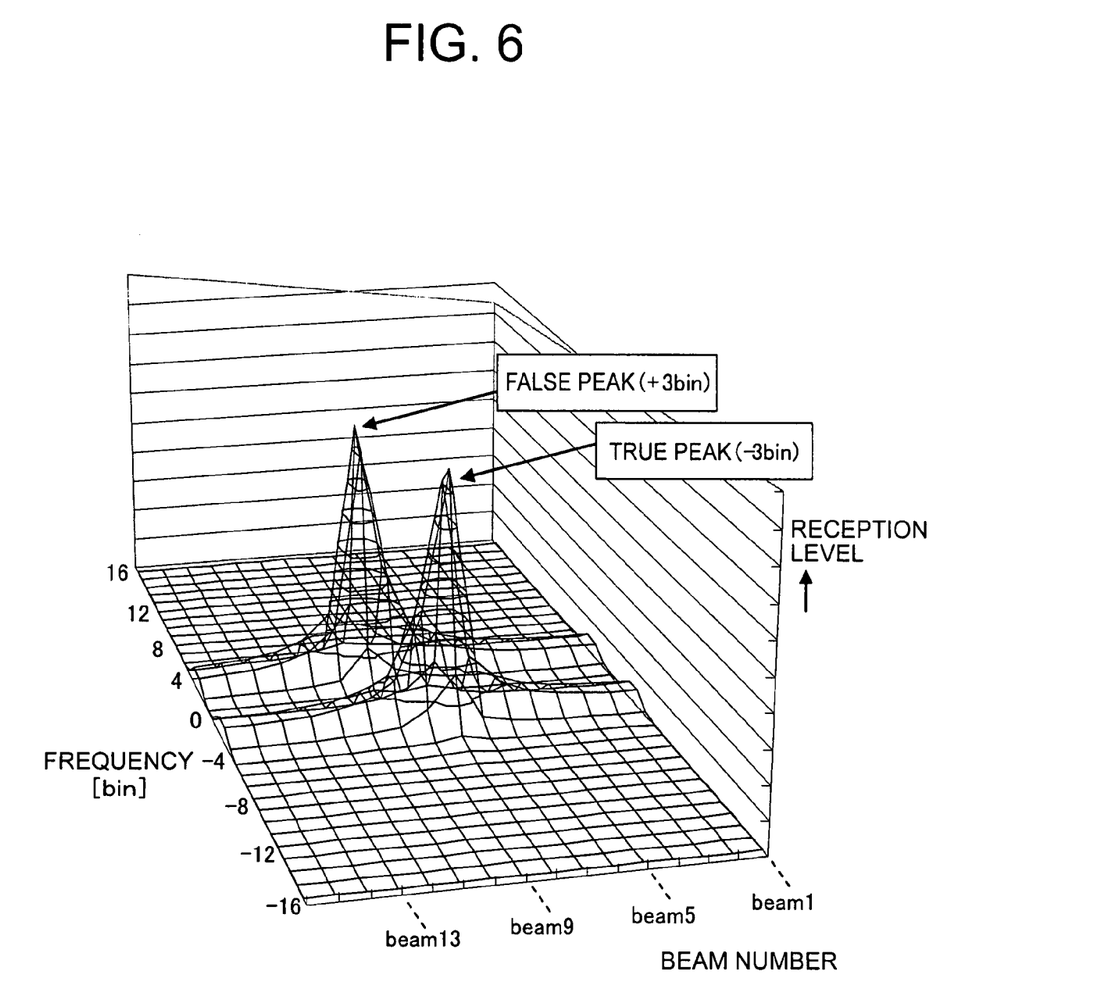
FIG. 6 is an explanatory view showing a general DBF processing result in case where the amounts of phase change are not set (i.e., the phase lags of individual receiving channels are all equal).

FIG. 4 through FIG. 6 show general processing results, respectively, in case where the amounts of phase lag are all equal to one another, and FIG. 7 through FIG. 10 show individual processing results in case where the amounts of phase lag are set to values unequal to one another according to the first embodiment of the present invention.

FIG. 4 shows the window function processing results in the form of waveforms for individual channels ch1 through ch16 in case where the amounts of phase lag of the reception channels are all equal to one another, wherein the axis of abscissa represents the sampling interval of A/D conversion data (e.g., in a unit of 0.06 [ms]), and the axis of ordinate represents the reception level.

In addition, FIG. 5 shows, in a complex plane (real number axis Re and imaginary number axis Im), the relation between the phases of peaks of the individual channels ch1 through ch16 (see arrows) based on the window function processing results of FIG. 4, wherein the phases θ1 through θ16 of true peaks and the phases −θ1 through −θ16 of false peaks of the individual channels are shown in symmetry.

FIG. 6 shows a DBF processing result based on the window function processing result of FIG. 4, wherein the axis of ordinate represents reception levels, and the axis of abscissa represents beam numbers (beam 1 through beam 16) and frequencies (in a range of ±16 bin). Here, it is assumed that beam 9 indicates the front direction of the radar apparatus 1.

Figure 7:
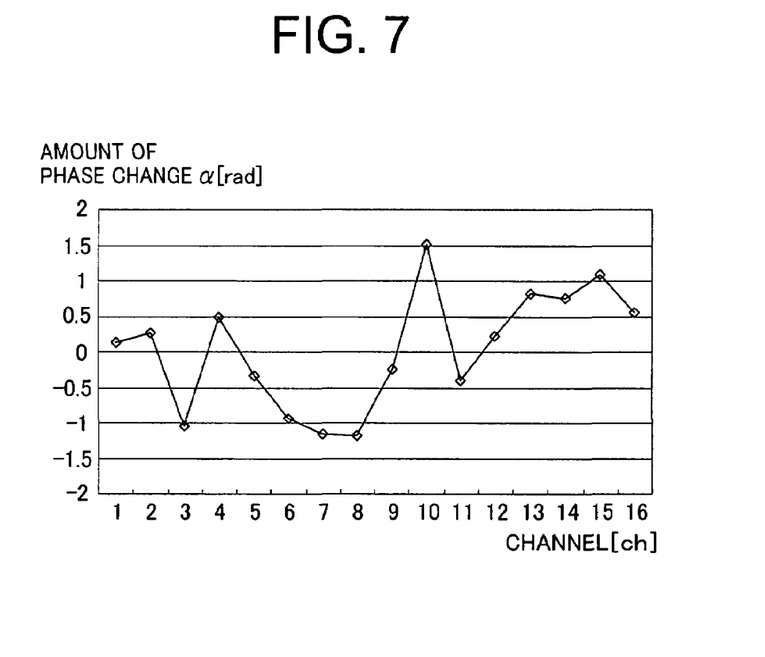
FIG. 7 is an explanatory view showing examples of the amounts of phase changes according to the first embodiment of the present invention.

FIG. 7 is an explanatory view showing examples of settings of the amounts of phase change (the amounts of phase lag) according to the first embodiment of the present invention, wherein the axis of abscissa represents channel numbers ch1 through ch16, and the axis of ordinate represents the amounts of phase change [rad] added to the individual receiving channels ch1 through ch16.

Figure 8:
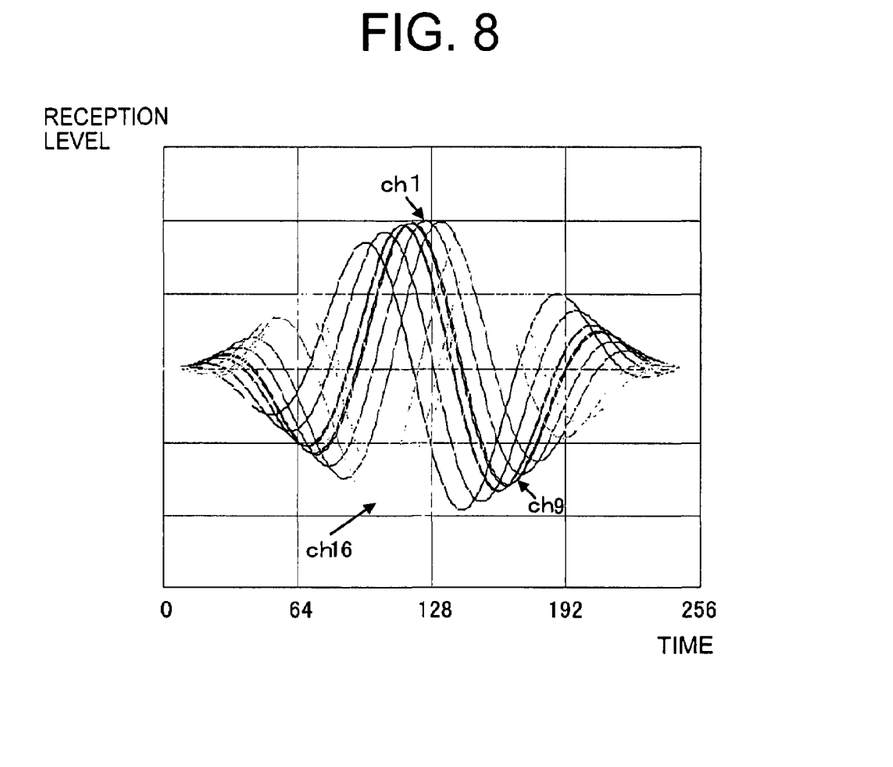
FIG. 8 is an explanatory view showing a window function processing result according to the first embodiment of the present invention.

FIG. 8 shows a window function processing result based on the amounts of phase change in FIG. 7, wherein the axis of abscissa represents the sampling interval, and the axis of ordinate represents the reception level.

Figure 9:
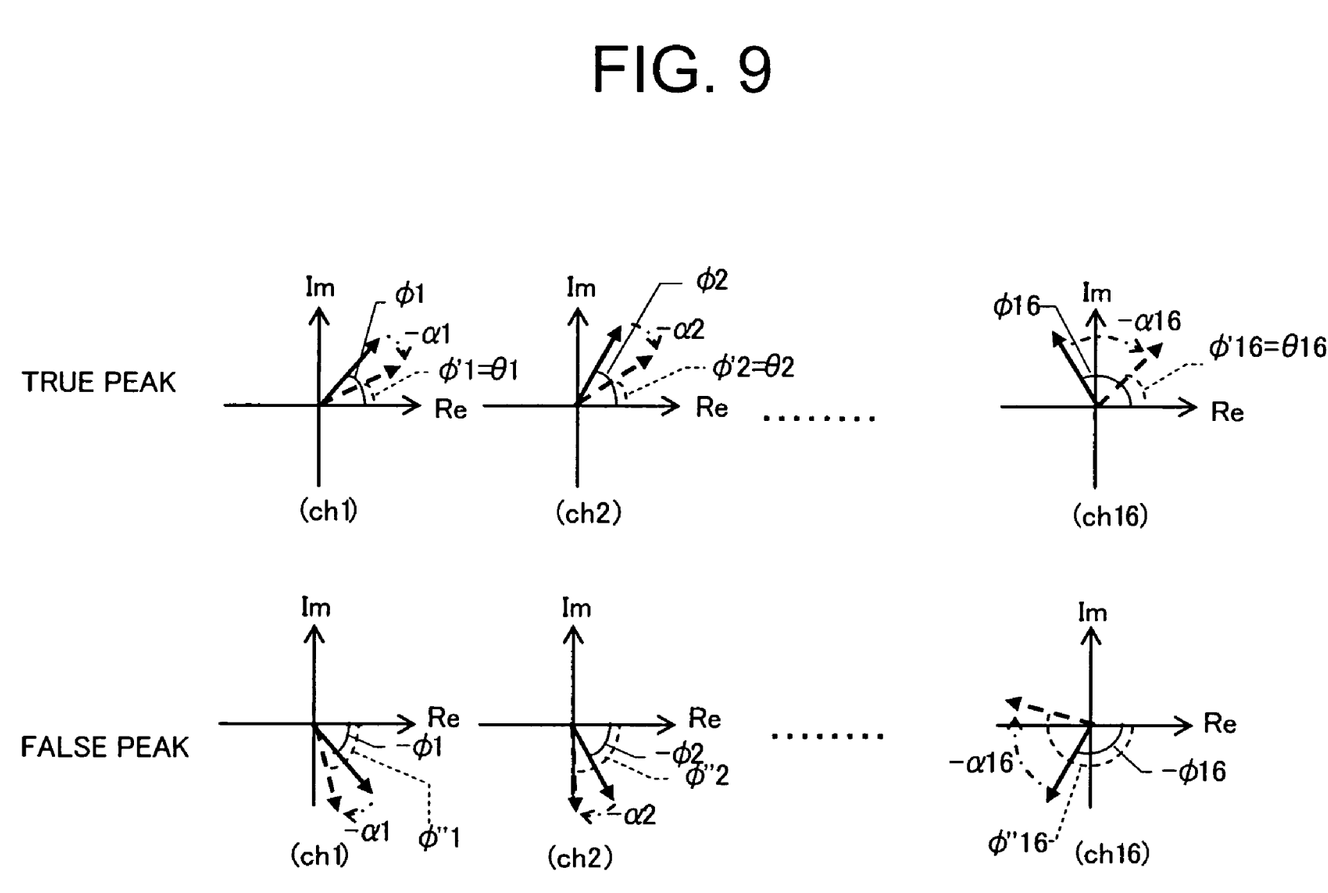
FIG. 9 is an explanatory view showing the relation between the phases of the peaks of the individual channels according to the first embodiment of the present invention.

In addition, FIG. 9 shows, in a complex plane (real number axis Re and imaginary number axis Im), the relation between the phases of peaks of the individual channels ch1 through ch16 (see arrows) based on the window function processing results of FIG. 8, wherein the phases θ1 through θ16 of true peaks and the phases −θ1 through −θ16 of false peaks of the individual channels are shown in symmetry.

Figure 10:
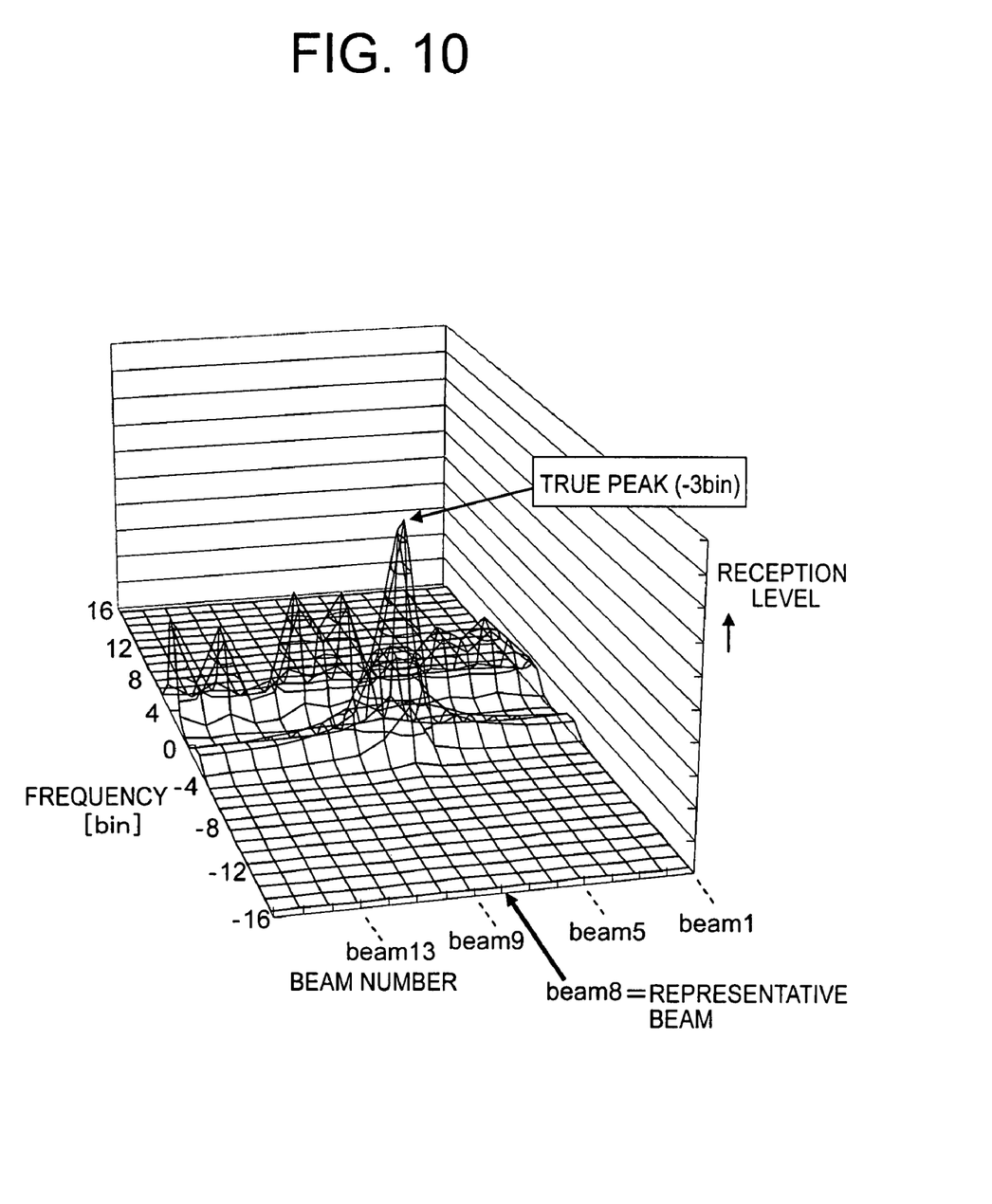
FIG. 10 is an explanatory view showing a DBF processing result according to the first embodiment of the present invention.

FIG. 10 shows a DBF processing result based on the window function processing result of FIG. 8, wherein the axis of ordinate is reception levels, and the axis of abscissa is beam numbers and frequencies. In this case, a beam 9 is in a front direction of the radar apparatus 1, and a beam 8 having the largest reception level becomes a representative beam.

First of all, reference will be made to the case where the amounts of phase lag are set to be equal to one another, as shown in FIG. 4 through FIG. 6.

In general, if the amounts of phase lag of the individual receiving channels ch1 through ch16 are all equal to one another, the window function processing results of the individual receiving channels ch1 through ch16 in the arithmetic unit 13 based on the reflected wave from the reflecting object 6 become a state in which their phases sequentially shift by an amount decided by an interval d between the individual receiving antennas 7 and the direction of the reflecting object 6, as shown in FIG. 4.

When the amounts of phase lag are all equal to one another, as shown in FIG. 4, the relation between a true peak and a false peak becomes such that their absolute values are equal to each other, as shown by arrows in a complex plane of FIG. 5. Also, the phases of false peaks with respect to the phases of the corresponding true peaks θn (n=1 through 16) for the individual channels ch1 through ch16 become "−θn (n=1 through 16)", so the phases of the false and true peaks are in the sign (plus and minus) inverted relation with each other.

Accordingly, when the DBF processing is performed based on the window function processing results of FIG. 4, there appear, as a true peak (frequency=−3 bin) and a false peak (frequency=+3 bin), two positive and negative peaks of frequencies (+±3 bin) that are equal in absolute value to each other and also equal in beam direction to each other, as shown in FIG. 6. In FIG. 6, the two peaks in the form of true and false peaks take a symmetric peak shape with respect to a frequency of 0 [bin] and an angle of 0 (i.e., the representative beam: beam 8), so it is not possible to determine or identify which of the two peaks is true or false, only based on the results of the DBF processing by the DBF processing part 23. Accordingly, though in conventional apparatuses, there has been adopted a method of making a determination by a comparison between an UP chirp and a DOWN chirp for example, it is impossible to obtain sufficient reliability, as stated above.

Thus, for the individual receiving channels ch1 through ch16, the amounts of random phase change αn (n=1 through 16) within a range of ±π/2 [rad] are added to the amounts of phase lag, as shown in FIG. 7, and the beat signal processing part 20 includes the phase correction processing part 22. By adding the amounts of random phase change αn to individual receiving channels, respectively, the window function processing results of the individual receiving channels ch1 through ch16 obtained by the beat signal processing part 20 based on the reflected wave from the reflecting object 6 are respectively displaced in phase by values which are equal to the sums of individual phase lag amounts (i.e., phase shifts decided by the intervals d between the adjacent individual receiving antennas 7 and the direction of the reflecting object 6) and corresponding phase change amounts αn, respectively, into a state phase-shifted at random without regard to the order of the receiving channels ch1 through ch16. At this time, the phases of peaks of the individual receiving channels ch1 through ch16 obtained by the beat signal processing part 20 based on the reflected wave from the reflecting object 6 are represented, as shown in complex planes in FIG. 9. In FIG. 9, solid line arrows indicate the true peak phases φn (n=1 through 16) and the false peak phases −φn of the individual receiving channels ch1 through ch16 in the results of the time FFT processing of the FFT processing part 21, and broken line arrows indicate true peak phases φ'n (=θn) and false peak phases −φ'n after phase correction (i.e., after subtraction of αn) by the phase correction processing part 22.

First of all, the true peak phases φn and the false peak phases −φn in the time FFT processing results are represented as shown by the following expressions (1) and (2) by using the true peak phases θn before addition of the amounts of phase change αn as well as the amounts of phase change αn to be added for the individual receiving channels, respectively.

$$\theta n = \theta n + \alpha n \quad (1)$$

$$-\phi n = -(\theta n + \alpha n) \quad (2)$$

Then, the phase correction processing part 22 performs phase correction processing on the time FFT processing results obtained by the FFT processing part 21. That is, by subtracting the amounts of phase change αn (known random values) from the phases of the true and false peaks φn, −φn of the individual receiving channels, respectively, the true peak phases φ'n and the false peak phases φn after the phase correction are obtained as shown by the following expressions (3) and (4).

$$\phi' n = \theta n \cdot \alpha n = \theta n \quad (3)$$

$$\phi n = -\phi n - \alpha n = -(\phi n + 2\alpha n) \quad (4)$$

As is clear from expressions (3) and (4) above, the true peak phases φ'n after the phase correction are corrected to right or correct phases θn, but the false peak phases φn are not corrected to right or correct phases (see broken line arrows in FIG. 9).

Hereinafter, though DBF processing according to the DBF processing part 23 is applied to the beat signal processing results after the phase correction, the amounts of phase change αn of the individual receiving channels (see FIG. 7) are set to random values based on a random number generator, so the relation of the phases of individual receiving channels loses periodicity for false frequency components, and the signals of the individual receiving channels are not summed up after the DBF processing.

When the window function processing results in the beat signal processing part 20 are processed until by the DBF processing part 23, true peaks (~3 bin) are corrected in such a manner that the amounts of phase lag corresponding to the individual receiving channels, respectively, become equal to one another, as shown in FIG. 10, thus resulting in the same shape as in the case where the phase lags of the individual receiving channels are all equal to one another (see FIG. 6), but the false peaks (+3 bin) take corrupt or deformed shapes in which the peaks are distributed to low peak reception levels.

Accordingly, in case where a plurality of peaks appear for plus and minus frequencies (±3 bin) which are equal in absolute value to one another, it can be determined or identified that one having a larger reception level is a true peak.

Since the above processing is performed in the processes of the UP chirp and the DOWN chirp, respectively, the data of the UP chirp and the data of the DOWN chirp need not be compared, so even when a plurality of reflecting objects do not exist, there does not arise a problem that the plus or minus sign of each frequency is misidentified resulting from an error in the combination of the UP chirp and the DOWN chirp.

As described above, the control apparatus for an internal combustion engine according to the first embodiment of the present invention comprises the sending unit 2 that sends a transmission wave, the plurality of receiving parts (the receiving antennas 7 and the amplifiers 8) that receive the reflected wave from the reflecting object 6 in a parallel manner, the beat signal generation parts (the mixers 9, the amplifiers 10, and the low-pass filters 11) that acquire beat signals at the plurality of individual receiving parts, respectively, from the transmission wave and the reception wave received at the receiving parts, the beat signal processing part 20 (and the A/D converters 12) that individually processes the beat signals at the plurality of individual receiving parts thereby to acquire a beat signal processing result, the DBF processing part 23 that DBF processes the beat signal processing result thereby to acquire a DBF processing result, and the object detection part 24 that acquires information on at least one of the distance R, the speed and the angle of the reflecting object 6 from frequency components of the DBF processing result or the beat signal processing result.

The amounts of phase lag of the plurality of individual receiving parts (the receiving channels ch1 through ch16) are set to unequal values (mutually different values) owing to the addition of the amounts of phase change αn, so that false frequency components after the DBF processing result obtained by the DBF processing part 23 can not be theoretically amplified.

In addition, the beat signal processing part 20 includes the phase correction processing part 22, and the phase correction processing part 22 corrects the amounts of phase lag corresponding to the plurality of individual receiving parts in the beat signal processing part 20 so as to make them equal to one another.

Thus, after being subjected to the phase correction of the phase correction processing part 22, the positive and negative frequency components received are DBF processed by the DBF processing part 23, whereby the reception levels of either correct ones of the positive and negative beat frequencies are increased so as to make it possible for only true frequency components to be summed and for false frequency components not to be summed, as a result of which the plus or minus sign of the frequencies can be identified by comparison of the magnitudes of the reception levels thereof, thereby making it unnecessary beat frequency combination processing during the increase or decrease of sending frequencies.

Moreover, the object detection part 24 decides, among the two positive and negative frequency components of which the absolute values are equal to each other based on the DBF processing result of the DBF processing part 23, the one of which the reception level is larger as a true frequency component, and the other of which the reception level is smaller as a false frequency component. Accordingly, it is possible to detect the true frequency component based on the reflecting object 6 in an accurate manner.

Although in the above-mentioned first embodiment, the amounts of phase lag of the individual receiving channels ch1 through ch16 are set at random so as not to have regularity, it is needless to say that operational effects equivalent to those as stated above can be obtained as long as the amounts of phase lag of the individual receiving channels are set to values unequal to one another, even if they have regularity.

Further, the polarity or sign of the beat signal frequency is selected by the polarity determination processing (step S107) prior to the peak detection processing (step S108), as shown in FIG. 3, but on the contrary, after execution of both of positive peak detection processing and negative peak detection processing, the reception levels of positive and negative peaks may be compared with each other so as to select either of them.

Furthermore, the peak of either a positive or negative frequency is selected in steps S107 and S108, but in case where there exist a plurality of reflecting objects, there is a possibility that the frequency component of a "false peak" appearing due to one reflecting object might be overlapped by a "true peak" due to another reflecting object, so in such a case, both of the positive and negative peaks may be selected as true peaks.

In this case, the one "false peak" and the other "true peak" are synthesized, and hence the reception level thus synthesized becomes higher than when only the false peak appears. Thus, if it is determined, based on a comparison between the reception levels of the individual positive and negative peaks, that each of the peaks indicates a reception level equal to or higher than a predetermined value, it is assumed that there exist a plurality of reflecting objects, and both of the positive and negative peaks are selected as true peaks. For example, the object detection part 24 decides, among the two positive and negative frequency components of which the absolute values are equal to each other based on the DBF processing result of the DBF processing part 23, the one of which the reception level is larger as a true frequency component (true peak), and also decides the truth (true or false) of the other frequency component of which the reception level is smaller based on a difference or ratio thereof to the reception level of the true frequency component.

Specifically, when the difference or ratio between the frequency component of the larger reception level (true peak) and the frequency component of the smaller reception level is less than a predetermined value, it is determined that the frequency component of the smaller reception level is also a true peak. On the other hand, when the above difference or ratio is larger than the predetermined value, it is determined that the frequency component of the smaller reception level is a false peak.

In addition, according to the above-mentioned first embodiment, in the radar apparatus 1 that performs measurement processing in a repeated manner, the positive and negative peaks are identified or determined based on the reception data received at a certain instant measurement point in time, but in case where it is difficult to determine the difference or ratio between the reception levels for some reason such as a low S/N ratio, etc., past measurement results may be stored, and the polarity determination processing (step S107) may be carried out by applying majority processing or the like based on a plurality of determination results within a fixed period of time.

In this case, for example, the object detection part 24 determines the truth (true or false) of the two positive and negative frequency components, of which the absolute values are equal to each other, at each measuring period, associates the individual frequency components at the current measuring time with the corresponding ones at the last measuring period, and determines, based on the past several results of truth determination, whether the current frequency components associated with the past frequency components are finally true.

As a result, it is avoided that the truth determination depends on a temporary truth determination result, thus making it possible to improve the reliability of the final truth determination result.

Although reference has been made, by way of example, to the case where the detection of only "Ich" is performed, the present invention may be applied to the case where processing (IQ detection) is carried out in which beat signals comprising a signal in the form of an Lo signal (local oscillation signal) with its phase rotated by 90 degrees (hereinafter referred to as "Qch") and reception signals at the individual receiving channels ch1 through ch16 are acquired, and an A/D input result of the beat signals is put into an imaginary part of an input when time FFT is carried out by the FFT processing part 21.

In this case, unless a phase difference between the Lo signal of the Ich and the Lo signal of the Qch at the time of detection is accurately set to 90 degrees, there arises a "false peak" of which the reception level is smaller than that of a true peak, but in this case, too, the amounts of phase lag of the individual receiving channels ch1 through ch16 are set to values unequal to one another, as stated above, so that the reception level of the false peak can be further suppressed by correcting the amount of phase change αn.

In addition, although in the above-mentioned first embodiment, the present invention is applied to the radar apparatus 1 having the single sending antenna 5, it may be applied to a well-known radar apparatus that has a sending antenna unit comprising a plurality of (e.g., two) parallel antennas, wherein the amounts of phase lag of individual sending antennas are set to values unequal to one another (mutually different from one another).

In this case, a sending unit includes a plurality of sending parts each comprising a voltage controlled oscillator, a distributor, an amplifier and a sending antenna are arranged in parallel, and individual Lo signals from the plurality of distributors are input to the mixers 9 with time differences with respect to one another.

Moreover, the phase correction processing part 22 in the beat signal processing part 20 serves to perform correction such that the amounts of phase lag, being the sums of the amounts of phase lag of the plurality of sending parts and the amounts of phase lag of the plurality of receiving parts, respectively, become equal to one another. With this, similar operational effects as described above can be achieved.

Further, although in the above-mentioned first embodiment, reference has been made, by way of example, to the radar apparatus of the FMCW system, the present invention can be applied to a pulse radar apparatus such as a pulse Doppler radar in which a sending frequency is neither increased nor decreased, while providing operational effects similar to those as stated above.

While the invention has been described in terms of a preferred embodiment, those skilled in the art will recognize that the invention can be practiced with modifications within the spirit and scope of the appended claims.

What is claimed is:
1. A radar apparatus comprising:
a sending unit that sends a transmission wave of a fixed frequency or variable frequency;
a plurality of receiving parts that receive a reflected wave of said sending wave from a reflecting object in a parallel manner;
beat signal generation parts that acquire beat signals for said plurality of individual receiving parts, respectively, from the transmission wave generated by said sending unit and the reflected or reception wave received by the individual receiving parts;
a beat signal processing part that individually processes the beat signals of said plurality of individual receiving parts thereby to acquire a beat signal processing result;
a DBF processing part that DBF processes said beat signal processing result thereby to acquire a DBF processing result; and
an object detection part that acquires information on at least one of a distance, a speed and an angle of said reflecting object from frequency components of said DBF processing result or said beat signal processing result;
wherein amounts of phase lag of said plurality of receiving parts are set to values mutually different from one another;
said beat signal processing part includes a phase correction processing part;
said phase correction processing part corrects the amounts of phase lag corresponding to said plurality of individual receiving parts in said beat signal processing part so as to make them equal to one another; and
wherein said object detection part decides, among two positive and negative frequency components of which the absolute values are equal to each other based on said DBF processing result, the one of which the reception level is larger as a true frequency component, and the other of which the reception level is smaller as a false frequency component.

2. The radar apparatus as set forth in claim 1, wherein the amounts of phase lag of said plurality of receiving parts are set in such a manner that false frequency components after the DBF processing result obtained by said DBF processing part are not theoretically amplified.

3. The radar apparatus as set forth in claim 1, wherein the amounts of phase lag of said plurality of receiving parts are set at random so as not to have regularity.

4. The radar apparatus as set forth in claim 1, wherein said sending unit comprises a plurality of sending parts that are arranged in parallel to one another;
amounts of phase lag of said plurality of sending parts are set so as to be mutually different from one another;
said phase correction processing part performs correction such that the amounts of phase lag, being sums of the amounts of phase lag of said plurality of sending parts and the amounts of phase lag of said plurality of receiving parts, respectively, become equal to one another.

5. The radar apparatus as set forth in claim 1, wherein said object detection part decides, among two positive and negative frequency components of which the absolute values are equal to each other based on said DBF processing result, the one of which the reception level is larger as a true frequency component, and also decides the truth of the other frequency component of which the reception level is smaller based on a difference or ratio thereof to the reception level of said true frequency component.

6. The radar apparatus as set forth in claim 1, wherein said object detection part determines the truth of said two positive and negative frequency components, of which the absolute values are equal to each other, at each measuring period, associates the individual frequency components at a current measuring time with corresponding ones at the last measuring period, and determines the final truth of the current frequency components associated with the past frequency components based on the past several results of truth determination.

* * * * *